United States Patent Office 3,369,345
Patented Feb. 20, 1968

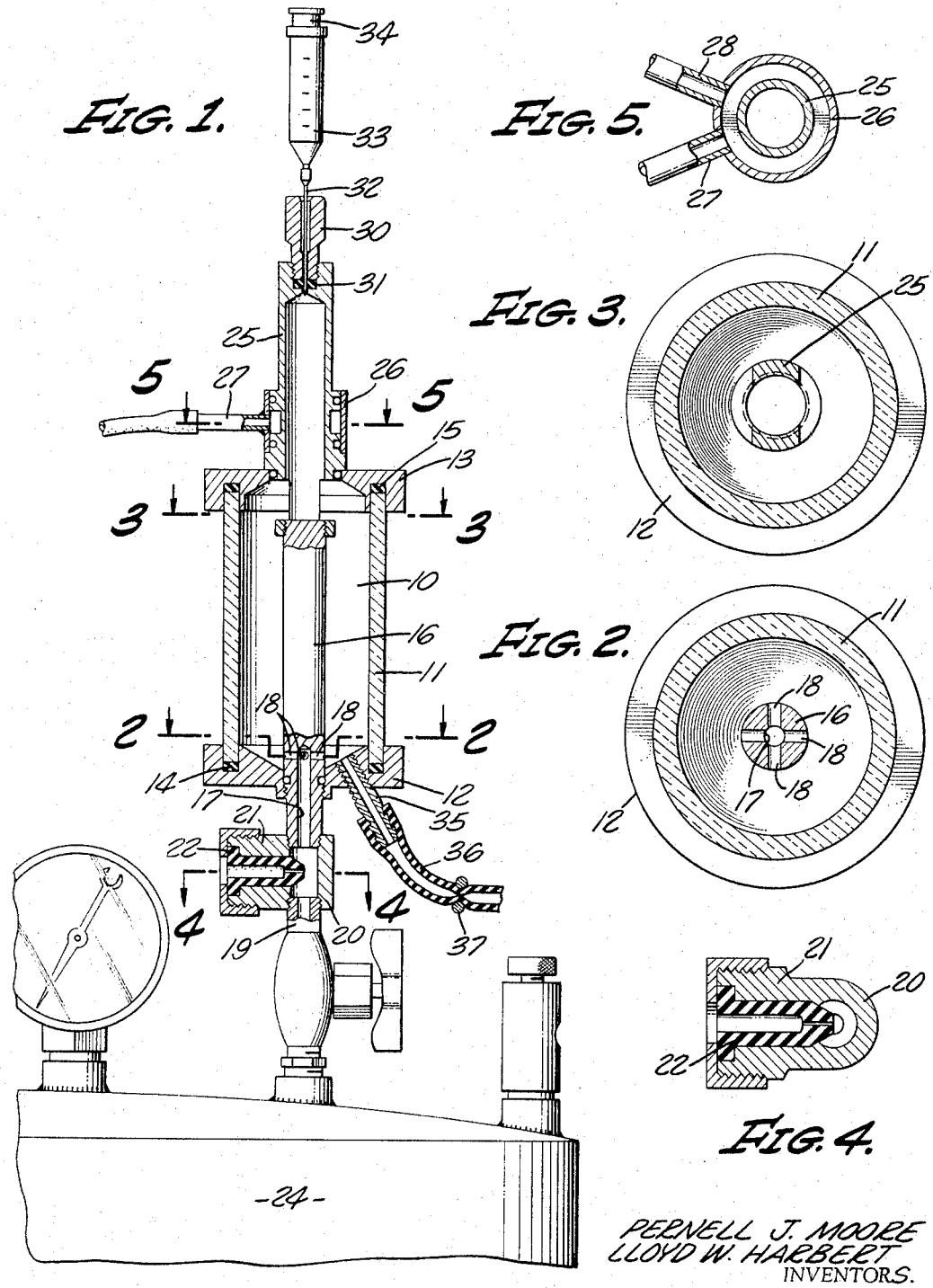

3,369,345
PROCESS FOR SEPARATING AND COLLECTING GAS FROM A LIQUIFORM SAMPLE
Pernell J. Moore and Lloyd W. Harbert, Houston, Tex., assignors to National Lead Company, New York, N.Y., a corporation of New Jersey
Filed Aug. 16, 1965, Ser. No. 479,871
3 Claims. (Cl. 55—50)

This invention relates to process for the isolation of gases from mixtures which may comprise various liquids and various solids, and more particularly, to a process which quickly and reliably isolates gas from such a mixture so that the gas may be analyzed by any desired means.

A constantly recurring problem in chemical analysis is the isolation of gas contained in a sample comprising liquids and often solids as well. The liquids may be themselves a mixture of immiscible liquids, such as liquid hydrocrabons, or various oils, and water; and the solids may be relatively inert, such as sand or silt or may even be solids which interact with the liquids to form more or less gelatinous or plastic structures. An example, and one in a field in which the present invention is particularly applicable, is drilling fluids as used in the drilling of oil and gas wells by the rotary method. Technically, such a drilling fluid will comprise a more or less homogenized mixture of water, clays, derived from drilling through shales as well as clays (including highly colloidal montmorillonite) added in the preparation of the fluid; sand and silt derived from the drilling operations; finely divided barite or other mineral added to increase the density of the fluid; petroleum oils, frequently added in the preparation and maintenance of the drilling fluid; and various petroleum constituents obtained during the course of drilling including constituents normally liquid at room temperature and gases. Even when the drilling fluid is of a so-called "oil-base-type," it will generally have some content of water and of the various mineral species already named.

In recent years, the routine testing of the drilling mud for traces of gas, and the correlation of the findings with the drilling depth has become an important tool in oil finding and, indeed, in the successful drilling and completion of any given well. In some cases, the mud issuing from the flow-line, or a portion thereof, is passed through a baffled trap or the like and gas is pulled out, often in a carrier stream of air. Or, samples of the gas may be placed in a drink mixer provided with a lid, and the air layer sampled after agitation of a sample of mud. Many other proposals have been made and used.

It is desirable, however, to provide a method for isolating gas from a sample of drilling mud, which quickly isolates all of the gas from the mud sample, without leaving any of it behind in the mud and without losing any as by leakage. In this fashion, highly quantitative analyses may be made, and the accuracy of the logging improved.

It will be apparent that an apparatus which makes it possible to isolate relatively small and even minute amounts of a gas from a liquid, semi-liquid, or even from a solid or semi-solid sample is of great value in analytical chemistry generally and may be applied to problems involving the analysis of dissolved or occluded gases in process liquids in chemical industries generally, and to innumerable similar problems, such as air in soil and sediment samples, air and other gases in sewage and industrial wastes, and the like. While we will describe our invention for convenience in the environment of well logging analysis, it will be clear that the apparatus and the method associated therewith are capable of wide utility.

An object of the present invention accordingly is to provide a process for the prompt and certain isolation of gas, even when present in minute concentrations, from a mixture which may comprise various liquids and various solids.

A further object of the invention is to provide such a process which not only isolates the gas in the sample but presents it in a manner making its removal from the apparatus and transfer to any desired analytical instrumentation convenient, complete, and secure against leakage, so that quantitative determinations may be made and reliably related to the sample employed.

Other objects of the invention will appear as the description thereof proceeds.

In the drawings, FIGURE 1 is a vertical section of an inventive device useful in carrying out our invention.

FIGURE 2 is a sectional view taken as shown by the arrows of FIGURE 1.

FIGURE 3 is a sectional view taken where shown by the arrows of FIGURE 1.

FIGURES 4 and 5 are sectional views taken where indicated by the respective arrows in FIGURE 1.

Generally speaking, and in accordance with an illustrative embodiment of our invention, we provide a mud sample chamber 10 of generally cylindrical shape and vertically disposed, as will be apparent from FIGURE 1. This is conveniently formed by a cylinder 11 clamped between a base plate 12 and a top plate 13 with "O" rings 14 and 15 providing a seal, the base and top plates being maintained in position by the cooperation of center post 16 and reflux head 25. The cylinder 11 is preferably constructed of heat-resistant glass, although metal such as stainless steel or chrome-plated brass may also be used.

Center post 16 provides entry for steam through a central opening 17 with side outlets 18, steam from any suitable source such as a conventional boiler 24 being admitted through a tubulation 19 and bottom fitting 20. Fitting 20 also contains a side outlet 21 which serves as a sample injection port through an elastomeric nipple 22, permitting the injection of a slug of a sample therethrough by means of a hypodermic-type syringe.

Through the top plate 13 there is attached a reflux head 25, which is essentially an upward extension of center post 16. This has essentially the form of a hollow cylinder around the lower part of which is constructed a water jacket 26 bearing tubulations 27 and 28 for circulating water (at room temperature) through the water jacket, whereby the lower part of the reflux head has a condenser function, the upper part of the reflux head serving as a relatively quiescent zone for collection of the liberated gases. The top of the reflux head 25 bears a gas extraction fitting 30, a seal being provided by a rubber septum 31 or like yieldable means so that the hollow needle 32 of the hypodermic syringe 33 may be inserted when desired so as to extract gas from the upper part of the reflux head 25. A drain for the chamber 10 is provided by nipple 35 with attached rubber hose 36 and pinch clamp 37. This makes it convenient to empty the chamber between runs without disassembling the apparatus. As will be apparent from the figures and the foregoing description, the interior of the mud sample chamber 10 is in free communication with the interior of the reflux head 25, the latter being sealed at the top, except during momentary extraction of gas through the rubber septum 31; the mud sample chamber is likewise sealed off at the bottom except that steam may enter from a boiler through the apertures 18; and, momentarily, mud may also be injected into the fitting 20 and thereby into the mixing chamber 10. And, as already noted, the chamber may also be momentarily opened during draining through nipple 35 and hose 36.

Now it will be understood that the apparatus as described could doubtless be operated in a variety of fashions, but we use the inventive apparatus in connection with our inventive process, and the latter will now be described in connection with the apparatus already discussed hereinabove.

It will be clear that the illustrative embodiment of our inventive apparatus provides a sample chamber fitted with self-closing inlet means for a sample; provided further with means for the ingress of steam in the bottom portion of said sample chamber, so arranged as to carry the sample into the chamber as well; with a reflux head in free communication with the upper portion of said sample chamber; with cooling means associated with said reflux head; with gas extraction means communicating with the top of said reflux head, the relationship of these parts being such that all condensate formed in the reflux head is able to fall back into the sample chamber, and also such that extraction of non-condensed gas will be complete and the gas will remain in the reflux head.

Now, referring to the drawings, we preferably commence an exemplary gas isolation cycle in accordance with our invention by purging the apparatus of any air contained therein, which if not removed would merely serve to dilute the gas extracted from the sample, which in some methods of analysis would be an inconvenience. This purging is readily accomplished by causing the reflux head 25 to communicate at the top thereof freely with the atmosphere, which may readily be accomplished by removing the gas extraction fitting 30 or, more simply, by pushing an empty hypodermic needle 32 through the rubber septum 31. Steam is then admitted through tubulation 19, without passing cooling water into the water jacket 26, whereupon after a short time the apparatus is purged of air by the action of the steam rushing upwardly. At the same time, of course, the apparatus becomes heated by the steam. As a further optional step, after this has been accomplished, cooling water may be passed through the jacket 26, whereupon refluxing will start, steam which has risen upwardly to the reflux head being condensed on the walls adjacent to the water jacket 26 and the liquid condensate of water so produced flowing back into the sample chamber 10. Any air which may have remained in the apparatus after the purging step, in the event, for example, that the latter was incomplete, will then appear in the top portion of the reflux head 25, and may be removed by means of a hypodermic syringe as already described. The sample is now injected into the fitting 20 through side outlet 21. The upward flow of steam in the bottom fitting 20 carries the sample upwardly through apertures 17 and 18 and into the sample chamber 10. In general, the total volume of sample injected in this part of the cycle may conveniently be, say 10 to 20 percent of the total free volume of the sample chamber 10. It will be understood, however, that the volume of the sample may vary within broad limits with the amount of gas expected to be removed, the physical state of the sample, and the like. The steam continues to pass into the mixing chamber and promptly brings the temperature of the sample up to that of the steam, which is, of course, that temperature corresponding to the steam pressure in the sample chamber, and therefore may be of the order of two to seven pounds per square inch gauge. Higher pressures may, of course, be used, but they are quite unnecessary. The injected sample having reached the temperature of the steam, any constituents thereof which are in vapor form at the steam temperature (which will, of course, be around 220–235° F., depending upon the barometric and gauge pressure), will be carried upward by the rising column of steam which fills the annular space of the sample chamber between center post 16 and cylinder 11, and will be carried upward into the reflux head 25. Those constituents which reach the reflux head in this fashion, but which are liquid at the temperature of the walls adjacent to the water jacket 16 in the interior of the reflux head 25, will be condensed thereon, and will fall down as liquid back into the sample chamber 10. Those constituents which are not liquifiable at the water jacket temperature, however, will remain isolated and, indeed, trapped in the upper part of the reflux head 25. This stage of the cycle is continued for a suitable time, until all of the steam-volatilizable and water-jacket-temperature-condensible constituents have been transported from chamber 10 to the reflux head 25 in the fashion described. Often, one or two minutes suffice.

Naturally, during this stage of the cycle, a certain amount of steam will have condensed and dropped back into the mixing chamber, thus increasing somewhat the total volume of liquid in the latter. However, the action in accordance with the invention is relatively rapid so that the increased volume of liquid in chamber 10 as a result of the condensation process is generally small indeed.

At the conclusion of this stage of the cycle, the hypodermic syringe 33 and needle 32 are inserted as shown in FIGURE 1, and the sample of gas which has been isolated and trapped in the reflux head 25 is withdrawn by pulling on the plunger 34 of the syringe 33. The syringe and needle are then withdrawn and the gas from the sample and now contained in the syringe 33 may be transferred to any desired analytical apparatus. At the present time gas chromatography is a powerful tool for many kinds of gas analysis and the hypodermic syringe and needle serves as a very convenient transfer device to gas chromatography apparatus or indeed to any other types of analysis such as mass spectrometers, infrared analysers, flame ionization detectors, thermal conductivity analysers, microcatalytic devices, and the like.

At the end of the cycle the spent sample mixture may be removed from the mud sample chamber 10 by opening hose clamp 37 while continuing to pass steam into the chamber to expel the mixture by means of the steam pressure. The apparatus is then ready for another cycle.

We have described the isolation process in accordance with our invention in terms of the use of steam, by which, of course, is meant steam from ordinary water. It is clear, of course, that any other suitable liquid could be used in place of steam, although the properties of water make it, for practical purposes, almost universally applicable in carrying out our invention even when the sample itself contains no water, as in the case of water-free oil-base drilling muds, certain chemical process liquids, and the like. We wish it to be understood therefore, that by "steam" in this disclosure and in the claims we do not mean to be confined to water but to equivalent liquids whenever they are suitable for the particular analysis at hand. Other suitable liquids may, in individual cases, be: 1,4-dioxane, diethyl ketone, dimethyl sulfoxide, and the like.

The operation of our apparatus, using ordinary steam from water, will be as described even if the sample contains no water. Thus, for example, when the injected sample comprises a diesel-oil-gelling agent-weighting-material mixture, the said sample having some gas occluded or dissolved therein to be isolated, the cycle will take place as described; any of the diesel oil which reaches the reflux head 25 as a result of this steam distillation effect will be condensed in the reflux head and will fall back into the sample chamber 10 along with similarly condensed steam.

In a representative device in accordance with the invention, we have constructed an apparatus as shown to scale in FIGURE 1 and associated cross sections, in which the metal parts of the apparatus are stainless steel, the sample chamber 11 is borosilicate glass (Pyrex), and the various gaskets and O-rings are of neoprene. The outside diameter of the glass cylinder 11 was 1.94 inches, the balance of the apparatus being to the scale shown in the drawings. A boiler pressure of about seven pounds per square inch gauge was used, and a typical sample volume was 5 cubic centimeters. Using this amount of clay-water drilling fluid containing approximately 1% each of methane, propane and butane, occluded therein, the entire isolation stage involving steam refluxing as described hereinabove was fully completed in about two minutes.

It is sometimes convenient, although by no means a necessity, to include with the injected sample a modicum of a surface active agent, which speeds up the access of steam to all parts of the sample when the latter is in the chamber. This is especially advantageous when the sample is oily in nature such an an oil-base drilling fluid. Naturally, a low sudsing surface active agent should be used, unless the latter is in minute quantity. The liquid household detergents universally available in supermarkets may be used, preferably previously diluted with, say, 10 parts of water. Such liquid detergents commonly consist of a solution of about 50 parts of water, 20–30 parts of a condensed phosphate, such as tetrapotassium pyrophosphate, sodium hexametaphosphate, or the like, perhaps 5% of liquid sodium silicate, and an alkyl arylpolyoxyethylene alcohol, an alkyl arylsulfonate, or the equivalent. A typical formulation appears in United States Patent 3,037,936. Other surface active agents are described in the book Surface Active Agents by Schwartz and Perry, New York, 1949, the contents of which are hereby incorporated herein by reference. If these are used at all, only a modicum such as 1/10 to an equal part by volume of the sample itself of a solution containing as an example 10% by volume of the aqueous solution detergent disclosed in the aforesaid United States Patent 3,037,936. Such a surface active agent addition is also beneficial in dispersing any mineral matter which may be present in the sample.

It will be apparent that while we have described our invention with the aid of numerous specific examples, and in terms of particular embodiments, and the like, numerous variations in detail and arrangement and the like are possible in both the inventive apparatus and process, so that the invention is to be considered a broad one, defined by the scope of the claims which follow.

Having described our invention, we claim:

1. The process of isolating in a withdrawable condition gas occluded in a liquiform sample which may contain liquefiable hydrocarbons which comprises the steps of: placing said sample in a sample chamber fitted with a reflux head which is closed at the top; passing steam into said sample chamber and contacting said sample contained therein; simultaneously supplying cooling means to the lower part of said reflux head so as to condense said steam and said liquefiable hydrocarbons and permit them to fall back into said sample chamber by reflux action; continuing said admission of steam and said reflux action until any gas contained in said sample has been completely carried into the upper part of said reflux head and separated from said liquifiable hydrocarbons; thereafter inserting gas collection means into said reflux head and withdrawing said gas from said reflux head.

2. The process in accordance with claim 1 in which said sample is carried into said sample chamber by the passage of said steam.

3. The process in accordance with claim 2 in which a modicum of a surface active agent is placed in said chamber with said sample.

References Cited

UNITED STATES PATENTS

| | | | |
|---|---|---|---|
| 3,009,536 | 11/1961 | Glasgow | 55—174 |
| 3,050,449 | 8/1962 | Moore | 203—49 |
| 3,104,947 | 9/1963 | Switzer et al. | 203—49 |
| 3,150,516 | 9/1964 | Linnenbom et al. | 73—19 |

OTHER REFERENCES

Schwartz et al., Surface Active Agents, Interscience Publishers Inc., N.Y., 1949, pp. 481–488.

REUBEN FRIEDMAN, *Primary Examiner.*

C. N. HART, *Assistant Examiner.*